United States Patent [19]

Focke

[11] Patent Number: 4,519,492
[45] Date of Patent: May 28, 1985

[54] METHOD AND APPARATUS FOR TRANSPORTING PACKS FROM A FEED TRACK TO A DISCHARGE-CONVEYOR TRACK

[75] Inventor: Heinz Focke, Verden, Fed. Rep. of Germany

[73] Assignee: Focke & Co., Verden, Fed. Rep. of Germany

[21] Appl. No.: 652,434

[22] Filed: Sep. 20, 1984

Related U.S. Application Data

[63] Continuation of Ser. No. 370,423, Apr. 21, 1982, abandoned.

[30] Foreign Application Priority Data

May 6, 1981 [DE] Fed. Rep. of Germany ....... 3117859

[51] Int. Cl.³ .............................................. B65G 47/24
[52] U.S. Cl. ..................... 198/408; 198/461
[58] Field of Search ............... 198/408, 407, 457, 723, 198/481, 410, 461

[56] References Cited

U.S. PATENT DOCUMENTS

| | | | |
|---|---|---|---|
| 1,961,697 | 6/1934 | Little | 198/408 |
| 2,003,519 | 6/1935 | Schnaier | 198/481 |
| 2,620,058 | 12/1952 | Smith et al. | 198/481 |
| 4,128,174 | 12/1978 | Frisbie et al. | 198/481 |

Primary Examiner—Joseph E. Valenza
Assistant Examiner—Kyle E. Shane
Attorney, Agent, or Firm—Sughrue, Mion, Zinn, Macpeak and Seas

[57] ABSTRACT

A spacing and transport apparatus for cigarette packs 10 includes a linear feed conveyor 11, a first rotary wheel 15 having peripheral depressions 25 for spacing the packs and conveying them along a first quadrant, a second rotary wheel 16 having peripheral arms 40 for further spacing the packs and conveying them along a second quadrant, and a linear discharge conveyor 17. The depression entrances are contoured to minimize pack impact, which is further reduced by oscillating the feed conveyor outlet in synchronism with the arrival of the depressions.

9 Claims, 3 Drawing Figures

METHOD AND APPARATUS FOR TRANSPORTING PACKS FROM A FEED TRACK TO A DISCHARGE-CONVEYOR TRACK

This application is a continuation of application Ser. No. 370,423, filed Apr. 21, 1982, now abandoned.

BACKGROUND OF THE INVENTION

The invention relates to a method and apparatus for introducing to a discharge-conveyor track, especially in the region of a packaging machine, packs which arrive, preferably close to one another, on a feed track.

The problem of deflecting packs, pack contents or other articles in the course of a transport operation or of transferring them from one conveyor track to another arises frequently and in different connections in packaging technology. The invention is concerned with the transfer of packs or other articles from an incoming (feed) track to a discharge-conveyor track. According to the object on which the invention is based, the packs will be transferred and deflected in a way which protects the packs while maintaining a high throughput.

SUMMARY OF THE INVENTION

To achieve this object, the method according to the invention is characterised in that the packs are first moved individually transversely to the feed track and, at the same time, are conveyed along a first curved path, such as a quadrant arc, with rotation of the packs through 90° relative to the position in the region of the feed track, and are then conveyed along a curved second path, again a quadrant arc, which is offset relative to the plane of the first path and which opens into the discharge-conveyor track.

Accordingly, the transfer or handing-over region of the packs from the (straight) feed track to the (straight) discharge-conveyor track takes the form of two curved paths of movement which extend in planes offset 90° relative to one another. Appropriately, the first quadrant arc adjoining the feed track is arranged in a vertical plane and the subsequent second quadrant arc is arranged in a horizontal plane. As a result of this, the feed track is likewise directed at an angle of 90° to the discharge-conveyor track, so that a deflection of the packs takes place to that extent.

According to a further feature of the invention, the packs are conveyed at increasing speed along the quadrant arcs. This results not only in an acceleration of the transport movement of the packs, but also in an increase in there spacing. When the packs arrive on the feed track close to one another, they are separated as a result of the process according to the invention.

The apparatus for introducing to a discharge-conveyor track the packs arriving on a feed track is characterised, according to the invention, in that a first quadrantal intermediate conveyor adjoins the feed track transversely to the feed track, and a second intermediate conveyor adjoins the first intermediate conveyor, is arranged offset 90° and opens into the discharge-conveyor track.

According to the invention, the intermediate conveyor is designed as a conveyor wheel revolving in a vertical plane about a horizontal axis of rotation, with engagement means located on the periphery, which each catch a pack and transport it along a quadrant. During this time the pack runs along on a fixed outer guide.

According to the invention, the second intermediate conveyor is designed as a conveyor cross with revolving engaging arms each for catching one pack by its rear side. Each engaging arm is equipped at the outer end with a finger which engages off-centre on the rear face of the pack and which transports the pack along a curved lateral guide over the length of a quadrant. The conveyor cross is mounted to revolve in a horizontal plane.

The conveyor wheel is designed so that during continuous rotation the packs can be received individually from the feed conveyor in a fault-free manner and transferred to the second intermediate conveyor. This cycle of movement is made possible by a special design of the engagement means and respectively of the depressions assigned to them, on the other hand, and of the fixed outer guide, on the other hand. The fault-free transfer to the revolving conveyor wheel of the packs arriving, preferably close to one another, on the feed conveyor is made possible because at least one region of the feed conveyor assigned to the conveyor wheel can swing to and fro, especially up and down, in such a way that the free end of the feed conveyor facing the conveyor wheel is periodically moved in the peripheral direction of the conveyor wheel in synchronism with the latter. During this phase, a pack is respectively transferred and received.

BRIEF DESCRIPTION OF THE DRAWINGS

An exemplary embodiment of the invention is explained in more detail below with reference to the drawings in which.

DETAILED DESCRIPTION OF THE PREFERRED EMBODIMENT

Figure 1:
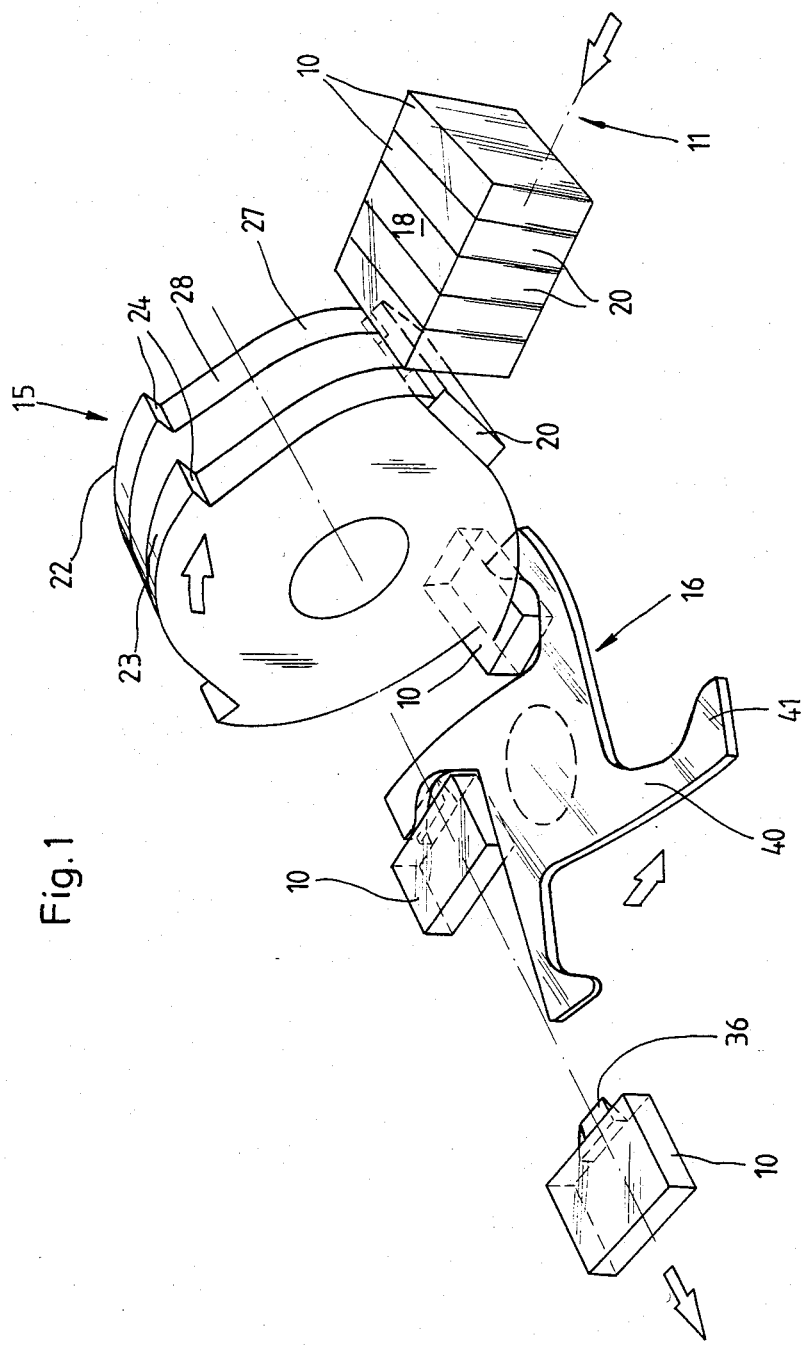
FIG. 1 shows, in a diagrammatic representation, the cycles of movement of the apparatus for deflecting and transferring packs.

The embodiment illustrated transports cuboid packs 10 (especially hinge-lid packs) within a packaging machine. Here, the packs 10 are finished to the extent that they still have to be provided only with an outer wrapper consisting of a transparent or plastic foil. As a result of the preceding units of the packaging machine, the packs 10 are delivered, in an upright position and close to one another, on a feed track by a feed conveyor 11. This can be designed in various ways. In the present case, the delivery end consists of a retaining shaft or duct 12 with an upper guide 13 and a lower guide 14 for the packs 10. Within this retaining shaft 12, the packs are moved further (at a fixed rate) by conveying members not shown (conveyor belts, engaging conveyors or the like).

A first intermediate conveyor consisting of a conveyor wheel 15 adjoins the feed conveyor 11 which, in the present case, extends essentially in a horizontal plane. This conveyor wheel is arranged essentially in a vertical plane and is driven to revolve continuously. At the same time, the peripheral region of the conveyor wheel 15 is moved along the free delivery end of the feed conveyor 11, the particular outermost pack delivered by the feed conveyor 11 being engaged by the conveyor wheel 15 and transported away downwards.

The movement of the pack 10 by the conveyor wheel 15 extends over an approximately quadrantal region in a vertical plane. The pack 10 is then transferred to a second intermediate conveyor which is designed, in the present case, as a conveyor cross 16 revolving in a horizontal plane. The packs 10 now lying flat are transported by this conveyor member along a likewise approximately quadrantal path in a horizontal plane and are then transferred to a discharge conveyor 17.

Consequently, the packs 10 are deflected through 90° in the conveying direction by a transport unit thus described in principle. The cuboid packs are directed respectively with narrow side faces 18 and 19 upwards and downwards in the region of the feed conveyor 11. In the region of the discharge conveyor, the side face 18 which was originally at the top forms the rear side of the pack. Smaller end faces 20 of the pack are directed sideways both in the region of the feed conveyor 11 and in the region of the discharge conveyor 17.

The conveyor wheel 15 as the first intermediate conveyor is provided with a central annular recess 21, so that two wheel discs 22 and 23 are obtained in the outer region. Each of these has, in the same place, engagement means 24, there being, in the exemplary embodiment illustrated, four engagement means arranged along the periphery at equal distances from one another. These are obtained by means of specially shaped depressions 25 on or in the outer region of the wheel discs 22, 23. Starting from a circular portion 26 of the wheel discs 22, 23, the depression 25 is limited by a spiral portion 27 adjoining said circular portion and thereafter by a straight or plane portion 28. The spiral portion 27 causes the packs 10 to be introduced into the depression during rotation of the conveyor wheel 15.

During transport, the packs 10 are retained in the depression 25, along an approximately quadrantal path, by a fixed outer guide 29. The bearing face of the outer guide 29 is made approximately in the form of a circular arc and in the lower region merges into a transport rest 30 for the packs in the region of the second intermediate conveyor (conveyor cross 16).

Figure 2:
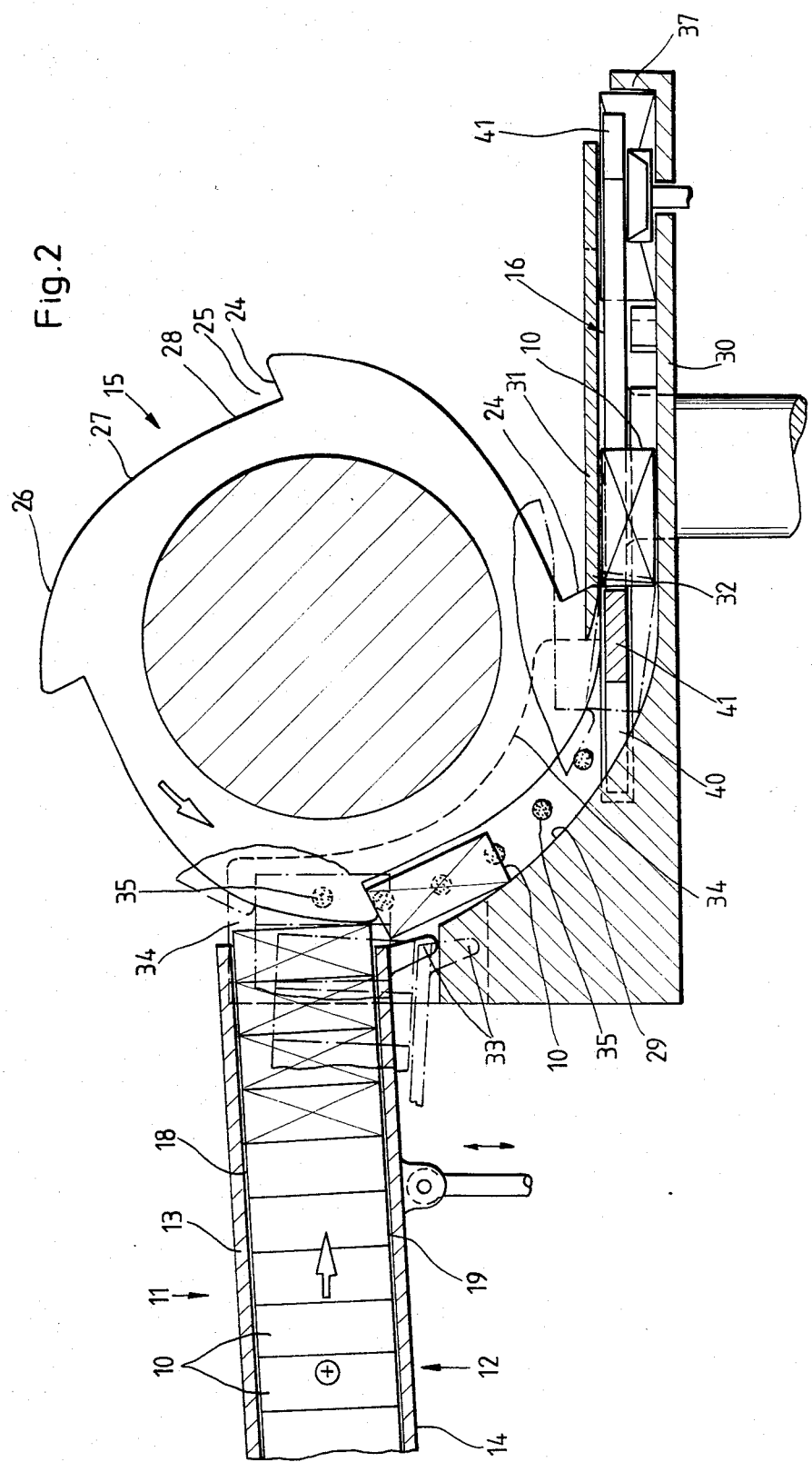
FIG. 2 shows the apparatus according to FIG. 1 in a side view and in a vertical section.
Figure 3:
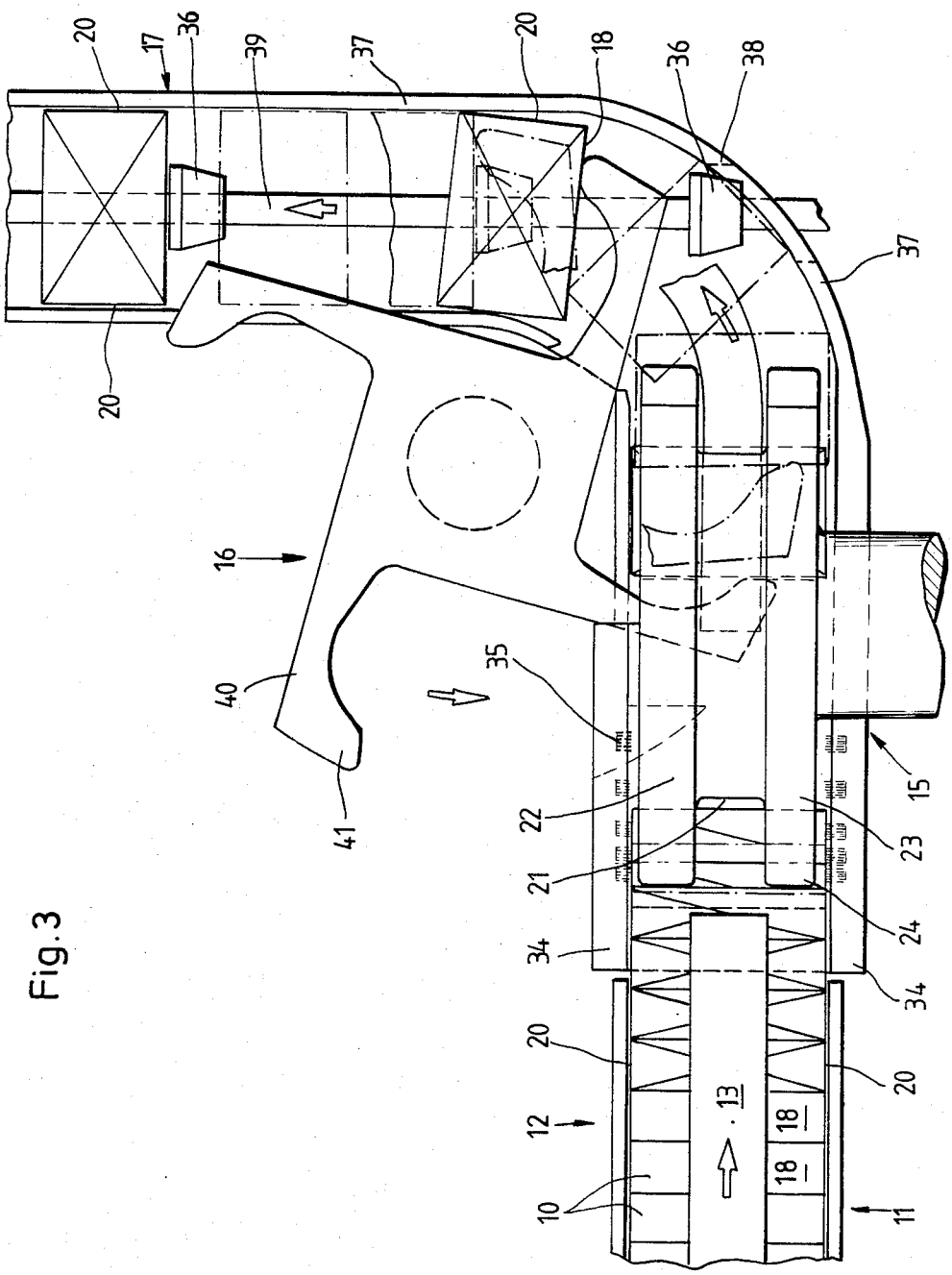
FIG. 3 shows a plan view of the apparatus according to FIG. 2.

The packs 10 are transported successively onto the feed conveyor 11, particularly the lower guide 14 of the latter, up to the position of transfer by the conveyor wheel 15. The cycles of movement are co-ordinated with one another so that a pack 10 released by the feed conveyor 11 is caught by an engagement means 24 moving past at the end of the feed conveyor 11 and is carried into the region of the outer guide 29. As shown in FIG. 2, after being received by the conveyor wheel 15 the pack does not yet rest completely in the depression 25. Only in the further transport phase is the pack 10 pressed by the outer guide 29 into the depression 25 up against the portion 28. The spiral portion 27 makes it possible for the packs to be received from the feed conveyor 11 in a fault-free manner since, during rotation of the conveyor wheel 15, the pack to be received first slides along on the circular portion 26 and then on the spiral portion 27 until it is caught by the engagement means 24.

The outer guide 29 is designed in the lower region so that the distance from the outer contour of the wheel discs 22, 23 becomes greater. As a result, the pack 10 automatically comes out of the depression 25, with its position against the outer guide 29 being maintained. The relative positions are shown by dot-and-dash lines in FIG. 2. An upper guide 31 in the region of the conveyor cross 16 penetrates into the recess 21 by means of the projecting tongue 32, that is to say between the wheel discs 22, 23, thereby causing the pack 10 to be gradually guided out of the depression 25. At the same time, the conveyor cross 16 comes into effect in this region by catching the rear side (side face 18) of the pack.

The transfer of the packs 10 from the feed conveyor to the conveyor wheel 15 takes place in a special way. The feed conveyor 11 designed as a retaining shaft 12 is made movable, particularly so as to swing up and down, in a region facing the conveyor wheel 15. The end of the retaining shaft 12 facing the conveyor wheel 15 has, during the downward movement, the same direction of movement as the conveyor wheel 15. The movements are coordinated with one another so that approximate synchronism between the retaining shaft 12 and the conveyor wheel 15 occurs momentarily. At this moment, a pack 10 is caught by the top side (the side face 18 located at the top) by an engagement means 24. The advance of the packs 10 within the retaining shaft 12 has, at this moment, proceeded to such an extent that the outer front pack 10 is released.

A guide projection 33 is attached to the underside of the retaining shaft 12 or to the lower guide 14 of the latter and, as an upper continuation of the outer guide 29, takes effect momentarily after a pack 10 has been received by the conveyor wheel 15. This is a phase of movement in which the pack 10 is not yet located completely in the region of the outer guide 29 (shown by unbroken lines in FIG. 2).

Since the first intermediate conveyor in the form of the conveyor wheel 15 transports a pack downwards relative to the feed conveyor 11 by means of the outer guide 29, measures are taken to prevent the pack 10 from running forward as a result of its own weight. For this reason restraining members in the form of transversely directed brushes 35 are located in the region between the side walls 34 of the outer guide 29. The ends of these brushes rest against the end faces 20 of the packs 10 turned towards them so that the packs can be transported only as a result of the action of the conveyor wheel 15.

The outer guide 29 merges, in the way described, in an arcuate manner into the horizontal transport rest 30. This leads, in turn, continuously into the discharge conveyor 17. In the present exemplary embodiment, the latter is designed as a chain conveyor. Engagement means 36 attached to chains or other endless conveying members penetrate into the path of movement of the packs 10 in the region of the arcuate deflection of the transport rest 30 and of a lateral guide 37 located on the radially outer side. For this purpose, the lateral guide 37 is provided with a through-orifice 38 for the engagement means 36. The transport rest 30 is equipped in a conventional way, in the region of the discharge conveyor 17 with a longitudinal slot 39 for the passage of a connection between the engagement means 36 and the chain.

The second intermediate conveyor consists of the conveyor cross 16, in the present case with four engaging arms 40 arranged offset relative to the radial direction. The conveyor cross 16 is driven to revolve continuously about a vertical axis. Each engaging arm 40 catches a pack 10 by its rear side (corresponding to the side face 18) at the lower outlet of the outer guide 29. For this purpose, the engaging arms 40 are provided, at the radially outer end, with an engaging nose 41 directed forwards in the conveying direction. This catches and transports the pack 10. The dimensions are such, here, that the pack 10 or the side face 18 are caught off-centre specifically by the radially outer side. This results in conveyance of the pack 10 along the lateral guide 37 in a constraint-free and fault-free manner.

As is evident from FIG. 2, the disc-shaped conveyor cross 16 is also arranged so that the packs 10 are caught by the engaging nose 41 in the upper cross-sectional region (the upper half of the pack). As a result, the lower region of the side face 18 is available for the application of the engagement means 36 of the chain conveyor. During one phase of the transfer, the pack 10 is caught by the rear side both by the engaging nose 41 of the conveyor cross 16 and also already by an engagement means 36.

The apparatus described ensures not only that the packs are deflected, but also that they are separated, specifically because the second intermediate conveyor (conveyor cross 16) is driven at a higher speed than the conveyor wheel 15, and the chain conveyor or the engagement means 36 thereof are driven at a higher conveying speed than the conveyor cross 16. The speed ratio between the conveyor wheel 15 and conveyor cross 16 can be provided, with the same rate of revolutions, by a greater centre-to-centre distance between the engaging noses 41.

A special feature of the invention is to be found in the interaction between the various conveying members, in such a way that, after a pack has been received by the first intermediate conveyor (conveyor 15), a continuous and uninterrupted flow of movement of the pack takes place, and each of these is received without the following conveying member stopping.

In the embodiment illustrated, the two intermediate conveyors 15 and 16 are designed so that in the region of these the packs are conveyed approximately along a quadrant. Alternatively, other (arcuate) paths can also be provided. Furthermore, these do not necessarily have to be made in the form of quadrants. Finally, it may be expedient, depending on the area of use, to arrange the first intermediate conveyor 15 to convey upwards and to arrange the second intermediate conveyor in a plane located correspondingly above the feed track (feed conveyor 11). Finally, the feed track 11 and discharge conveyor 17 can be designed in another way and, above all, can be arranged to lie in other planes.

I claim:

1. A transport apparatus for cuboid packs (10) such as cigarette packs having relatively wide front and rear faces and relatively narrow tops, bottoms and sides, particularly adapted for use in conjunction with a packaging machine, comprising:
   (a) an elongate feed conveyor (11) for serially supplying incoming packs in an upright position with their wide faces abutting at an outlet end thereof,
   (b) a first intermediate conveyor (15) comprising a first continuously driven rotary wheel disposed adjoining the outlet end of the feed conveyor for individually withdrawing packs therefrom and for rotating such packs through 90° about an axis parallel to an axis of said wheel such that a narrow side of each pack is foremost in the direction of movement,
   (c) a second intermediate conveyor (16) comprising a second rotary wheel continuously driven at the same speed as the first wheel and disposed adjoining the first wheel downstream from the outlet end of the feed conveyor for individually tangentially withdrawing packs carried by the first wheel and for rotating such packs through 90° about an axis parallel to an axis of said second wheel, the respective rotational axes of the first and second wheels being offset 90°, peripheral pack engaging zones of the second wheel having a greater radius than corresponding zones of the first wheel to thereby increase the spacing between successive packs, and a maximum radius of the first wheel being less than the shortest distance from the center thereof to a nearest face of the second wheel such that said wheels do not intersect or mesh with each other,
   (d) a discharge conveyor (17) disposed adjoining an outlet zone of the second wheel for individually withdrawing packs carried thereby,
   (e) the outer periphery of the first wheel defining a plurality of equally circumferentially spaced depressions (25) for individually receiving a pack for conveyance, and
   (f) each depression being defined by a circular contour (26) of substantially constant radius smoothly merging, in a direction opposite the rotational direction of the wheel, into a spiral contour (27) of increasing radius, in turn smoothly merging into a straight portion (28) terminating at an outwardly extending abutment (24) disposed perpendicular to said straight portion, each depression thus presenting a gradually increasing depth to packs being supplied by the feed conveyor to thereby implement a mechanically "soft" transfer of the packs and minimize any stress impacts.

2. Apparatus according to claim 1, wherein the first and second wheels are respectively oriented in vertical and horizontal planes.

3. Apparatus according to claim 2, further comprising a curved outer guide (29) extending over a quadrant of the first wheel and having an increasing radius of curvature for directing the packs at an increasing conveying speed towards the second wheel.

4. Apparatus according to claim 3, further comprising a tongue (32) projecting into a central recess (21) of the first wheel (15) at a discharge zone thereof for stripping the packs therefrom.

5. Apparatus according to claim 3, further comprising lateral retaining brushes (35) extending inwardly from side walls (34) of the guide for restraining the free movement of the packs.

6. Apparatus according to claim 1 wherein the second wheel revolves in a horizontal plane and has a plurality of equally circumferentially spaced, outwardly extending arms (40) for engaging the rear faces of the packs.

7. Apparatus according to claim 1, further comprising curved lateral guides (37) extending over a quadrant of the second wheel for directing the packs towards the discharge conveyor.

8. Apparatus according to claim 6, wherein the engaging arms (40) having noses (41) at their ends which project circumferentially for engaging the rear faces of the packs on their radially outer and upper sides.

9. Apparatus according to claim 1, further comprising drive means coupled to the feed conveyor for oscillating the outlet end thereof transverse to a longitudinal axis thereof, in the peripheral direction of the first wheel and in synchronism with the arrival of the pack receiving depressions at said outlet end, to thereby implement a mechanically "soft" transfer of the packs from the feed conveyor to the first wheel and attendantly minimize any stress impacts.

* * * * *